(12) United States Patent
Yoshida

(10) Patent No.: US 8,363,191 B2
(45) Date of Patent: Jan. 29, 2013

(54) ACTIVE MATRIX SUBSTRATE, DISPLAY PANEL AND DISPLAY DEVICE

(75) Inventor: Masahiro Yoshida, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1017 days.

(21) Appl. No.: 12/377,864

(22) PCT Filed: Jun. 8, 2007

(86) PCT No.: PCT/JP2007/061613
§ 371 (c)(1),
(2), (4) Date: Feb. 18, 2009

(87) PCT Pub. No.: WO2008/062575
PCT Pub. Date: May 29, 2008

(65) Prior Publication Data
US 2010/0156945 A1    Jun. 24, 2010

(30) Foreign Application Priority Data
Nov. 21, 2006 (JP) ................................ 2006-314533

(51) Int. Cl.
*G02F 1/1343* (2006.01)
*G02F 1/1345* (2006.01)
(52) U.S. Cl. ........ 349/139; 349/142; 349/143; 349/149; 345/206
(58) Field of Classification Search ............ 349/43, 349/145, 139, 142–143, 149; 345/206
See application file for complete search history.

(56) References Cited

FOREIGN PATENT DOCUMENTS

| | | |
|---|---|---|
| JP | 11-297760 A | 10/1999 |
| JP | 2000-075257 A | 3/2000 |
| JP | 2000-347600 A | 12/2000 |
| JP | 2004-212500 A | 7/2004 |
| JP | 2005-195788 A | 7/2005 |
| JP | 2006-234918 A | 9/2006 |
| JP | 2006-276361 A | 10/2006 |
| WO | 2005/121881 A1 | 12/2005 |
| WO | WO 2005121881 A1 * | 12/2005 |

OTHER PUBLICATIONS

Official Communication issued in International Patent Application No. PCT/JP2007/061613, mailed on Sep. 11, 2007.
Official Communication issued in corresponding European Patent Application No. 07744933.8, mailed on Apr. 19, 2010.

* cited by examiner

*Primary Examiner* — Nathanael R Briggs
(74) *Attorney, Agent, or Firm* — Keating & Bennett, LLP

(57) ABSTRACT

In an active matrix substrate, a plurality of pixels are arranged to correspond to a display region of a liquid crystal panel that has a shape other than a rectangular shape. Further, scan lines that are arranged along rows with the smaller number of the pixels than the other rows among a plurality of scan lines and data lines that are arranged along columns with the smaller number of the pixels than the other columns among a plurality of data lines intersect each other at a position other than the display region.

13 Claims, 12 Drawing Sheets

ACTIVE MATRIX SUBSTRATE, DISPLAY PANEL AND DISPLAY DEVICE

BACKGROUND OF THE INVENTION

1. Field of the Invention

The present invention relates to an active matrix substrate in which a plurality of pixels are provided in a matrix configuration, and a display panel and a display device including the same.

2. Description of the Related Art

In recent years, accompanying the widespread use of thin displays represented by a liquid crystal display device, the applications thereof have been diversified still further. For example, the liquid crystal display device is sometimes used in a dashboard (an instrument panel) or the like of a car. In other words, in order to respond to the diversification of the applications of liquid crystal display devices, it has been desired to provide the liquid crystal display device with a display panel having an odd-shaped display region such as a trapezoidal display region, a circular display region or a polygonal display region with at least five vertexes other than an existing rectangular display region, so that there has been a demand for an increase in the degree of freedom of the design of the outer shape thereof. Furthermore, in the liquid crystal display device, it has also been desired from the viewpoint of cost and a mechanism to reduce the size of regions other than the display region so as to enhance an effective display area ratio in the display panel.

On the other hand, as described in JP 2000-75257 A or JP 2004-212500 A, for example, conventional liquid crystal display devices including a display region formed to have an odd shape such as an elliptical shape, a sectional shape or a polygonal shape have been proposed. More specifically, in these conventional examples, a rectangular liquid crystal display device is formed first and then broken or divided, whereby the liquid crystal display device including the odd-shaped display region is produced.

Also, in conventional liquid crystal display devices, as described in JP 2005-195788 A, it has been proposed, for example, to form a sectional cut-out portion in a circular liquid crystal panel and provide the cut-out portion and an outer peripheral portion with input terminals of two kinds of signal lines for active driving of the liquid crystal panel, respectively.

In other words, in this conventional example, a plurality of input terminals that are connected respectively to a plurality of scan lines arranged concentrically on an active matrix substrate and input scan signals have been provided along an edge of the above-described cut-out portion. Also, in this conventional example, a plurality of input terminals for data line that are connected respectively to a plurality of data lines provided individually to extend toward the center of the circle on the active matrix substrate and input data signals have been provided along an edge of the above-described outer peripheral portion. Then, in this conventional example, the plurality of scan lines and the plurality of data lines have been arranged to intersect each other on the active matrix substrate, and a plurality of pixels including a TFT (Thin Film Transistor), a pixel electrode, etc. have been provided at the intersections, thus making it possible to perform active driving pixel by pixel in the circular liquid crystal panel.

However, the conventional liquid crystal display devices as described above have had a problem in that brightness unevenness and a line defect, in which only the brightness of the pixels for one scan line or those for one data line is different from the brightness of the pixels for the other lines, are generated, resulting in a lowered display quality.

More specifically, in the above-described conventional liquid crystal display devices, when the odd-shaped display region as mentioned above is formed, the scan lines and the data lines that have different numbers of pixels have been formed in the plurality of scan lines and the plurality of data lines on the active matrix substrate. Therefore, in the conventional liquid crystal display devices, the scan lines and the data lines that have different loads have been formed in the plurality of scan lines and the plurality of data lines, so that it has not been possible to prevent the generation of the brightness unevenness and the line defect, resulting in a lowered display quality in some cases.

Further, in the conventional liquid crystal display devices, it is also conceivable to correct the non-uniformity of respective loads in the plurality of scan lines and the plurality of data lines by changing the magnitude (voltage value) of respective signals for the scan lines and the data lines depending on the number of pixels. However, in the case of active driving by changing the signal voltage value as described above, it is required to minutely change the respective signal voltage values for the scan lines and the data lines depending on the difference in the number of pixels or to change the signal voltage values for the respective data lines according to the brightness of information to be displayed. Therefore, it has been practically impossible to correct the load non-uniformity by changing the signal voltage values.

SUMMARY OF THE INVENTION

In view of the problems described above, preferred embodiments of the present invention provide an active matrix substrate that can easily prevent the display quality from decreasing even when it is used for a display region with a shape other than a rectangular shape, and a display panel and a display device including the same.

An active matrix substrate according to a preferred embodiment of the present invention includes a plurality of pixels in a matrix form having a plurality of rows and a plurality of columns and used as a substrate of a display panel, a plurality of first signal lines that are arranged along a row direction in the matrix, and a plurality of second signal lines that are arranged along a column direction in the matrix so as to intersect the first signal lines, wherein, in the plurality of pixels, the number of the pixels provided along at least one row and the number of the pixels provided along the other rows are different from each other and the number of the pixels provided along at least one column and the number of the pixels provided along the other columns are different from each other, so as to correspond to a display region of the display panel that is has a shape other than a rectangular shape, and a first signal line that is arranged along a row with the smaller number of the pixels than the other rows among the plurality of first signal lines and a second signal line that is arranged along a column with the smaller number of the pixels than the other columns among the plurality of second signal lines intersect each other at a position other than the display region.

In the active matrix substrate with the above-described configuration, in the above-described plurality of pixels provided in matrix, the number of the pixels provided along at least one row and the number of the pixels provided along the other rows are different from each other and the number of the pixels provided along at least one column and the number of the pixels provided along the other columns are different from each other, thereby making it possible to correspond to a display region of the display panel that has a shape other than a rectangular shape. Also, the first signal line that is arranged along the row with the smaller number of the pixels than the other rows among the plurality of first signal lines and the second signal line that is arranged along the column with the smaller number of the pixels than the other columns among the plurality of second signal lines are arranged to intersect each other at the position other than the display region. This makes it possible to generate capacitances at the intersection at the position other than the display region in the individual first and second signal lines with the small number of pixels, so that the load non-uniformity can be corrected in the individual first and second signal lines without changing any signal voltage values to the first and second signal lines. Thus, unlike the conventional example described above, it is possible to prevent the generation of the brightness unevenness and the line defect, etc. resulting from the load non-uniformity, thus easily preventing the display quality from decreasing, even at the time of use for a display region with a shape other than a rectangular shape.

It should be noted that the pixels mentioned above can include not only pixels provided in the above-noted effective display region that is visually identified by a user but also dummy pixels provided in a non-display region (position other than the display region) that is not visually identified by a user.

Also, in the above-described active matrix substrate, in the plurality of first signal lines and the plurality of second signal lines, one signal line of the first signal line that is arranged along the row with the smaller number of the pixels than the other rows and the second signal line that is arranged along the column with the smaller number of the pixels than the other columns may be arranged to extend so as to intersect the other signal line at the position other than the display region.

In this case, the size reduction of the active matrix substrate can be achieved in a simple manner.

Further, in the above-described active matrix substrate, it is preferable that at least one signal lines of the plurality of first signal lines and the plurality of second signal lines include signal lines whose signal input directions of signals to be inputted are different from each other, and it is further preferable that the signal lines whose signal input directions are different from each other are arranged alternately.

In this case, compared with the case where the plurality of signal lines whose signal input directions mentioned above are the same are arranged, the routing work of these signal lines can be simplified. Furthermore, a dielectric strength between the signal lines can be enhanced easily, and leakage of the signal voltage can be addressed easily. In addition, when the signal lines whose signal input directions are different from each other are arranged alternately, it becomes easier to enhance the dielectric strength between the signal lines and address the leakage of the signal voltage.

Moreover, in the above-described active matrix substrate, it is preferable that when the one signal lines of the plurality of first signal lines and the plurality of second signal lines include the signal lines whose signal input directions are different from each other, input sides of the signals in the one signal lines intersect the other signal lines of the plurality of first signal lines and the plurality of second signal lines at the position other than the display region.

In this case, compared with the case where non-input sides of the signals are arranged to intersect, it is possible to easily prevent the leakage of the signal voltage between the above-noted one signal lines while simplifying the routing work of these one signal lines. As a result, the active matrix substrate that has a small fraction defective and is produced in a simple manner can be constituted.

Also, in the above-described active matrix substrate, opposed areas where the plurality of first signal lines and the plurality of second signal lines are opposed to each other at their intersection at the position other than the display region may be larger than opposed areas where they are opposed to each other at their intersection in the display region.

In this case, the capacitance generated at the intersection at the position other than the display region can be increased reliably, thus making it possible to correct the load non-uniformity in the individual first and second signal lines easily.

Further, in the above-described active matrix substrate, the opposed areas at the intersection at the position other than the display region may be at least twice as large as the opposed areas at the intersection in the display region.

In this case, it is possible to correct the load non-uniformity in the individual first and second signal lines more easily.

Moreover, in the above-described active matrix substrate, an insulating film provided at the intersection of the plurality of first signal lines and the plurality of second signal lines at the position other than the display region may be thinner than that provided at the intersection in the display region.

In this case, the capacitance generated at the intersection at the position other than the display region can be increased reliably, thus making it possible to correct the load non-uniformity easily in the individual first and second signal lines.

Additionally, in the above-described active matrix substrate, the thickness of the insulating film provided at the intersection at the position other than the display region may be equal to or smaller than a half of that of the insulating film provided at the intersection in the display region.

In this case, it is possible to correct the load non-uniformity in the individual first and second signal lines more easily.

Furthermore, the above-described active matrix substrate may include a substrate main body in which the plurality of first signal lines and the plurality of second signal lines are arranged, and a circuit placement portion including a first driving circuit and a second driving circuit arranged to input signals to the plurality of first signal lines and the plurality of second signal lines, respectively.

In this case, the work of connecting the plurality of the first signal lines and the plurality of the second signal lines with the first and second driving circuits can be carried out in a simple manner and a compact active matrix substrate with an excellent handleability can be achieved.

In addition, a display panel according to another preferred embodiment of the present invention includes any of the above-described active matrix substrates.

In the display panel with the above-described configuration, since the active matrix substrate that can easily prevent the display quality from lowering even when it is used for the display region with the shape other than the rectangular shape is used, it is possible to easily achieve a display panel having an excellent display performance.

Also, in the above-described display panel, it is preferable that its outer shape is determined based on the display region formed to have the shape other than the rectangular shape.

In this case, a display panel in which the size of regions other than the display region is reduced to provide a high effective display area ratio can be achieved easily.

Further, the above-described display panel may include an opposed substrate that is disposed so as to be opposed to the active matrix substrate, and a liquid crystal layer that is provided between the active matrix substrate and the opposed substrate.

In this case, it is possible to easily achieve a liquid crystal panel having an excellent display performance.

Moreover, a display device according to a preferred embodiment of the present invention includes a display portion, wherein any of the above-described display panels is used in the display portion.

In the display device with the above-described configuration, since the display panel that has the display region with the shape other than the rectangular shape and the excellent display performance is used in the display portion, it is possible to easily achieve a high-performance display device including the display region with the shape other than the rectangular shape.

In accordance with a preferred embodiment of the present invention, it becomes possible to provide an active matrix substrate that can easily prevent the display quality from lowering even when it is used for a display region with a shape other than a rectangular shape, and a display panel and a display device including the same.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

The following is a description of preferred embodiments of a display device according to the present invention, with reference to the accompanying drawings. In the following description, an example in which the present invention is applied to a transmission type liquid crystal display device will be illustrated.

Preferred Embodiment 1

Figure 1:
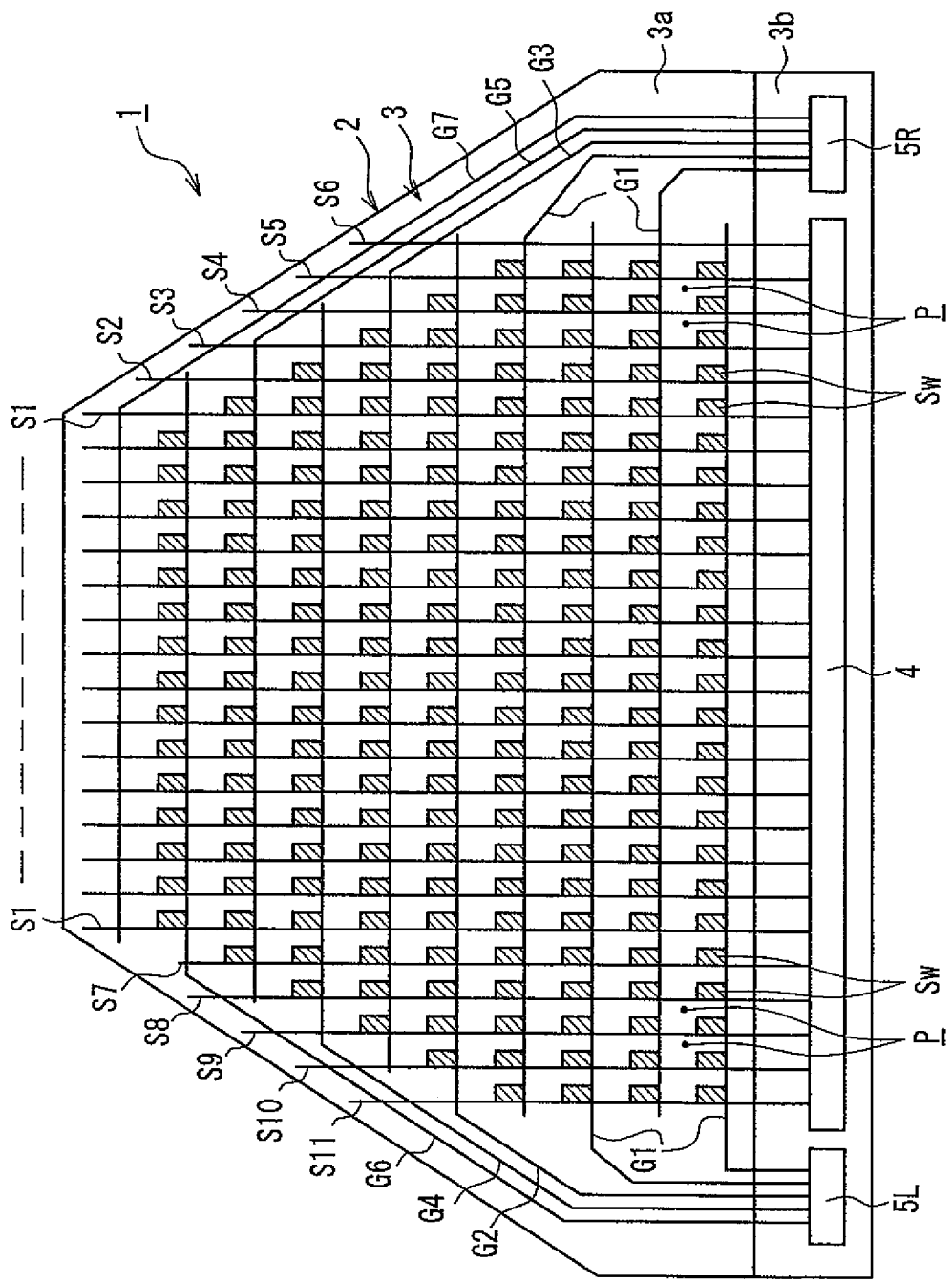
FIG. 1 is a plan view showing a major configuration of an active matrix substrate according to Preferred Embodiment 1 of the present invention and a liquid crystal display device including the same.

FIG. 1 is a plan view showing a major configuration of an active matrix substrate according to Preferred Embodiment 1 of the present invention and a liquid crystal display device using the same. In FIG. 1, a liquid crystal display device 1 in the present preferred embodiment includes a liquid crystal panel 2 serving as a display portion formed to have a trapezoidal outer shape, and an active matrix substrate 3 according to a preferred embodiment of the present invention. In the liquid crystal display device 1, a plurality of pixels P are provided in matrix having a plurality of rows and a plurality of columns.

As illustrated in FIG. 1, the active matrix substrate 3 includes a substrate main body 3a in which a plurality of data lines S1 to S11 (in the following, collectively referred to as "S") and a plurality of scan lines G1 to G7 (in the following, collectively referred to as "G") are arranged, and a driver placement portion 3b in which a source driver 4 that is connected to the data lines S and inputs data signals and gate drivers 5L and 5R that are connected to the scan lines G and input scan signals are provided. The scan lines G and the data lines S respectively constitute first and second signal lines that are arranged along a row direction and a column direction in the matrix.

The substrate main body 3a preferably has a trapezoidal shape obtained by combining a rectangle and a trapezoid, and can correspond to a trapezoidal display region. On the other hand, the driver placement portion 3b forms a circuit placement portion in which the source driver 4 serving as a second driving circuit and the gate drivers 5L and 5R serving as first driving circuits are provided, and has a rectangular shape. Incidentally, although FIG. 1 indicates a border line of the substrate main body 3a and the driver placement portion 3b by a solid line (a straight line) in order to show the substrate main body 3a and the driver placement portion 3b clearly, the substrate main body 3a and the driver placement portion 3b are formed as one piece in an actual active matrix substrate 3 without any border line as indicated above (the same will apply to FIGS. 5, 8, 10 to 12 mentioned later).

Further, in the substrate main body 3a, a plurality of switching elements Sw (indicated as a hatched portion in the figure) are provided in each intersection of the data lines S arranged vertically in FIG. 1 and the scan lines G arranged horizontally in FIG. 1. For example, a thin film transistor (TFT) is used as each of these switching elements Sw, which is provided in each of the plurality of pixels P described above.

In other words, in the liquid crystal panel 2, the switching elements Sw are provided, and a region partitioned by two adjacent data lines S and two adjacent scan lines G defines a pixel region of each of the pixels P. Then, in the liquid crystal panel 2, as shown in FIG. 1, the display region with the trapezoidal shape obtained by combining the rectangle and the trapezoid is formed. Furthermore, the outer shape of the liquid crystal panel 2 is determined based on the trapezoidal display region. In this manner, in the liquid crystal panel 2, the size of regions other than the display region is reduced, thereby making it possible to increase an effective display area ratio in the entire panel surface (display screen) easily.

Now, referring to FIGS. 3 and 4, the pixel P of the liquid crystal panel 2 will be described more specifically.

Figure 3:
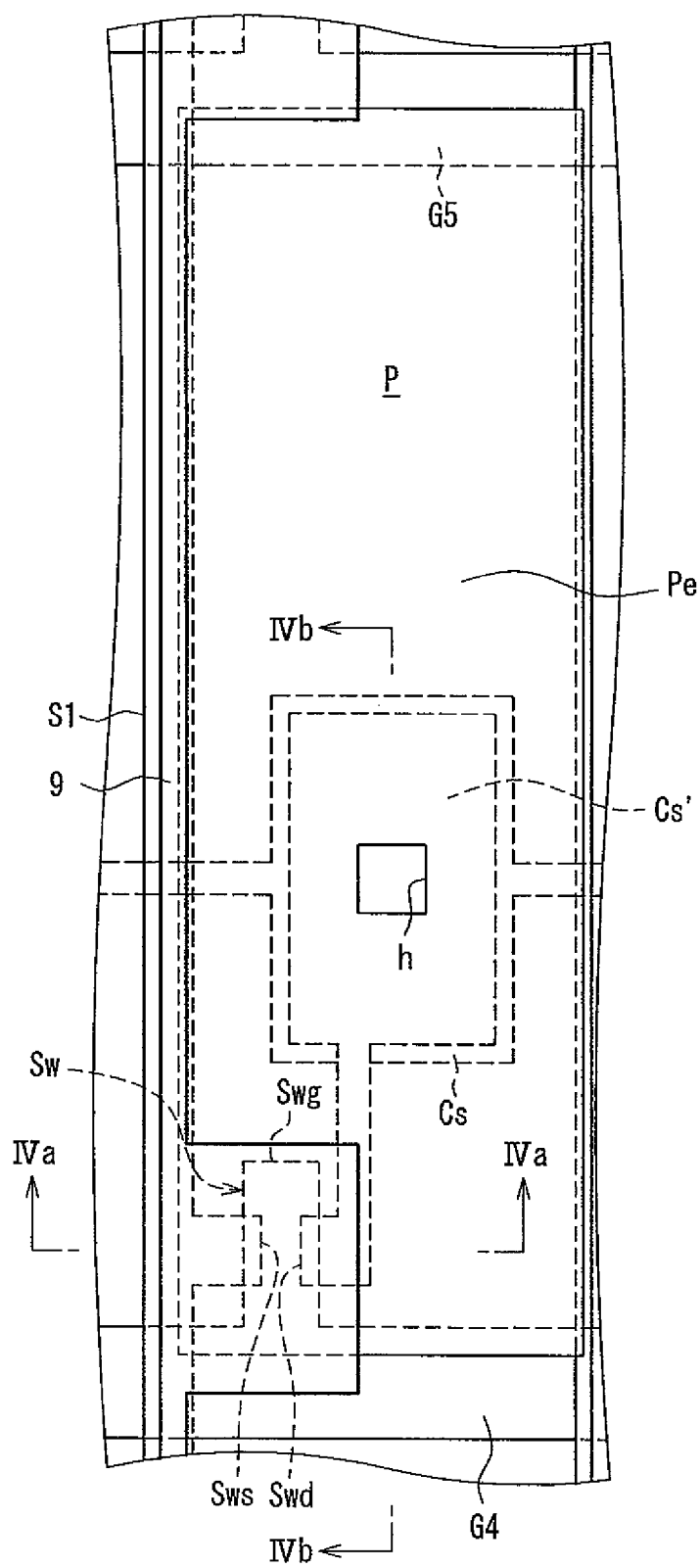
FIG. 3 is a drawing for describing a specific configuration of a pixel shown in FIG. 1.
Figure 4A:
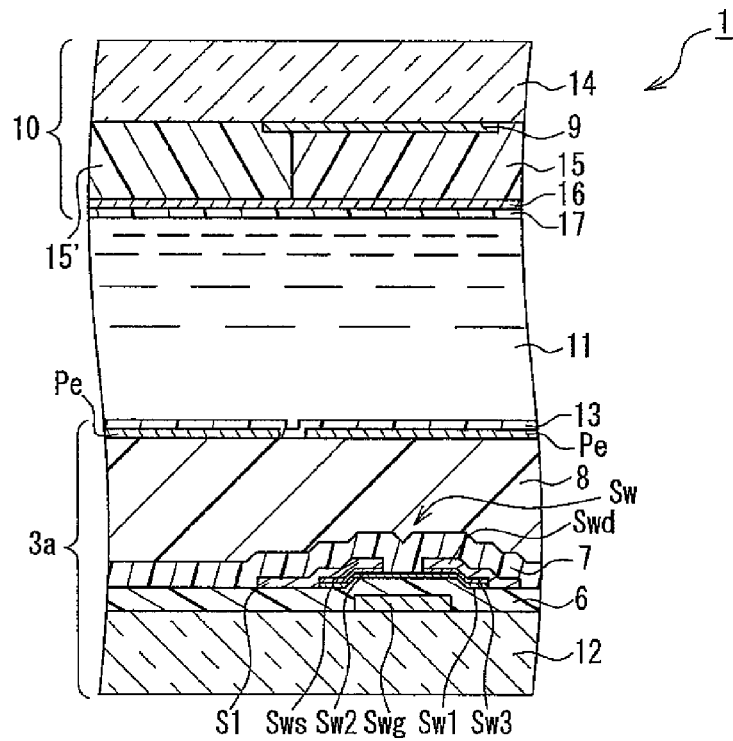
FIG. 4A is a sectional view taken along line IVa-IVa in FIG. 3.
Figure 4B:
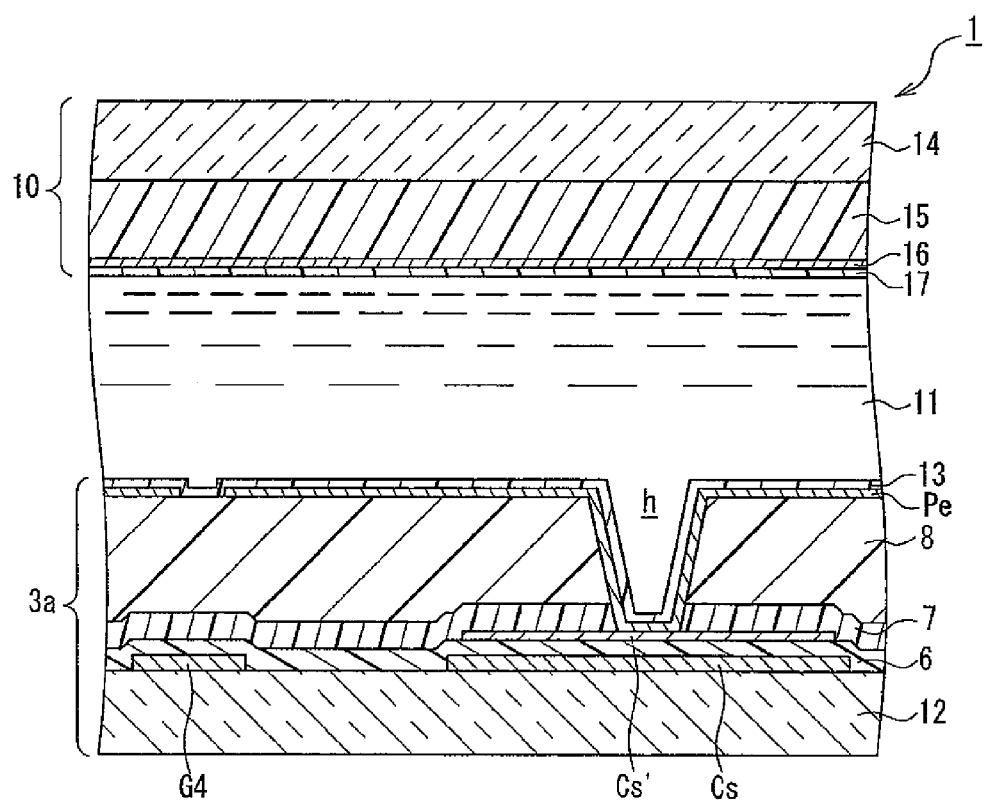
FIG. 4B is a sectional view taken along line IVb-IVb in FIG. 3.

FIG. 3 is a drawing for describing a specific configuration of the pixel shown in FIG. 1. FIG. 4A is a sectional view taken along line IVa-IVa in FIG. 3, and FIG. 4B is a sectional view taken along line IVb-IVb in FIG. 3.

As illustrated in FIG. 3, in the pixel P, the switching element Sw, a pixel electrode Pe and an auxiliary capacitor opposition electrode Cs' are provided inside a pixel region surrounded by the two data lines S1 and the scan lines G4 and G5. Also, a black matrix 9 is arranged on the data lines S1 and the switching element Sw. It should be noted that, for the sake of simplicity, the pixel electrode Pe of the pixel provided on the left with respect to the data line S1 is omitted in FIG. 3.

A source electrode Sws of the switching element Sw is connected to the data line S1, and a gate electrode Swg thereof is connected to the scan line G4. Also, a drain electrode Swd of the switching element Sw is connected to the auxiliary capacitor opposition electrode Cs' provided so as to be opposed to an auxiliary capacitor wiring Cs, and the auxiliary capacitor opposition electrode Cs' is connected to the pixel electrode Pe.

Then, in this pixel P, when a scan signal is inputted from the scan line G4 to the gate electrode Swg so as to turn on the switching element Sw, a data signal (a voltage signal) according to a gray scale of information to be displayed is inputted from the data line S1 to the source electrode Sws. Thereafter, the data signal is outputted from the source electrode Sws via the drain electrode Swd and the auxiliary capacitor opposition electrode Cs' to the pixel electrode Pe, so that the voltage of the data signal is retained in this pixel P.

Further, as shown in FIG. 4, the liquid crystal display device 1 includes the substrate main body 3a of the active matrix substrate 3, an opposed substrate 10 that is disposed so as to be opposed to the substrate main body 3a of the active matrix substrate 3, and a liquid crystal layer 11 that is provided between the substrate main body 3a and the opposed substrate 10 of the active matrix substrate 3.

The substrate main body 3a includes a transparent substrate 12 formed of a glass material or a synthetic resin material. As shown in FIG. 4A, in the vicinity of the switching element Sw, the data line S1 and the gate electrode Swg that are provided in parallel with each other and an insulating film 6 that is formed so as to cover these data line S1 and gate electrode Swg are provided on the transparent substrate 12. Moreover, a semiconductor layer Sw1, contact layers Sw2 and Sw3, the source electrode Sws and the drain electrode Swd of the switching element Sw, a protective film 7, an interlayer insulating film 8, the pixel electrode Pe and an alignment film 13 are layered in this order above the insulating film 6.

Further, the opposed substrate 10 includes a transparent substrate 14 formed of a glass material or a synthetic resin material. The black matrix 9, a color filter 15 of any color of R, G and B and a color filter 15' of the adjacent pixel P are formed on this transparent substrate 14. Also, an opposition (common) electrode 16 and an alignment film 17 are layered in this order on the color filters 15 and 15' that have colors different from each other.

Also, as shown in FIG. 4B, the san line G4 and the auxiliary capacitor wiring Cs are provided in parallel with each other on the transparent substrate 12 in the vicinity of the auxiliary capacitor opposition electrode Cs' and covered with the insulating film 6. The auxiliary capacitor wiring Cs is arranged so as to be opposed to the auxiliary capacitor opposition electrode Cs' via the insulating film 6. Moreover, the auxiliary capacitor opposition electrode Cs' is connected to the pixel electrode Pe in a contact hole h. Furthermore, the scan line G4 is formed to intersect the data line S1 via the insulating film 6.

A TN mode liquid crystal is used as the liquid crystal layer 11, for example, and in the liquid crystal display device 1, irradiated with light from a backlight device (not shown) disposed below the transparent substrate 12 (on a non-display screen side). Further, a polarizing plate (not shown) is attached to a lower surface of the transparent substrate 12 and an upper surface of the transparent substrate 14 opposite to the liquid crystal layer 11. Then, in the liquid crystal display device 1, the liquid crystal layer 11 is driven pixel by pixel according to information to be displayed, whereby an amount of light passing through this liquid crystal layer 11 is controlled so as to display the information on the display screen of the liquid crystal panel 2.

Returning to FIG. 1, in the substrate main body 3a, the number of the pixels P provided along at least one row and the number of the pixels P provided along the other rows among the plurality of rows that are parallel with the horizontal direction of FIG. 1 are different from each other, in order to correspond to the above-mentioned trapezoidal display region. Also, in the substrate main body 3a, the number of the pixels P provided along at least one column and the number of the pixels P provided along the other columns among the plurality of columns that are parallel with the vertical direction of FIG. 1 are different from each other.

Also, in the substrate main body 3a, in order to form the above-described odd-shaped pixel region, the data lines S1 to S11 having different lengths are provided in the data lines S. Then, the source driver 4 inputs the data signals to the data lines S1 to S11 from one direction (upward from the bottom in the figure).

On the other hand, the scan lines G include the signal lines G1 to G7 that are connected to either of the gate drivers 5L and 5R provided so as to sandwich the source driver 4 and have scan signal input directions different from each other. In other words, as shown in FIG. 1, the gate driver 5L is connected with the two scan lines G1 and the scan lines G2, G4 and G6, and the gate driver 5R is connected with the two scan lines G1 and the scan lines G3, G5 and G7 that are arranged alternately with the two scan lines G1 and the scan lines G2, G4 and G6 connected to the gate driver 5L. Then, the gate driver 5L inputs the scan signals to the corresponding scan lines G1, G2, G4 and G6 from the left side of the figure, and the gate driver 5R inputs the scan signals to the corresponding scan lines G1, G3, G5 and G7 from the right side of the figure.

As described above, the scan lines G include the scan lines G1, G2, G4, G6 and the scan lines G1, G3, G5, G7 whose signal input directions of the scan signal to be inputted are different from each other. Therefore, compared with the case where the plurality of scan lines G with the same signal input directions are arranged on the substrate main body 3a, the routing work of these scan lines G can be simplified. Furthermore, a dielectric strength between the scan lines G can be enhanced easily, and leakage of the scan signals (voltage) can be addressed easily. In addition, since the scan lines G1, G2, G4, G6 and the scan lines G1, G3, G5, G7 are arranged alternately, it becomes easier to enhance the dielectric strength and address the leakage described above.

Incidentally, besides the above description, similarly to the scan lines G, it is also possible to divide the data lines S into two data line groups whose signal input directions of the data signals are different from each other, thus inputting the data signals from the two source drivers, respectively.

Further, the data line S6 is a dummy data line and provided on the substrate main body 3a so that parasitic capacitances of the individual pixels P at an outermost periphery, namely, in a right end column in FIG. 1 are equivalent to parasitic capacitances of the other pixels P. Further, a switching element, which is not shown in the figure, is connected in the vicinity of individual intersections of this data line S6 with the four scan lines G1, and dummy pixels that do not contribute to information displaying are formed. This prevents the brightness unevenness resulting from the difference in parasitic capacitance and in opening ratio between the data line S and the pixel electrodes Pe in the individual pixels P in the right end column.

Similarly, the scan line G7 is a dummy scan line and provided on the substrate main body 3a so that parasitic capacitances of the individual pixels P at an outermost periphery, namely, in an upper end row in FIG. 1 are equivalent to parasitic capacitances of the other pixels P. Further, a switching element, which is not shown in the figure, is connected in the vicinity of individual intersections of this scan line G7 with the 16 data lines S1, and dummy pixels that do not contribute to information displaying are formed. This prevents the brightness unevenness resulting from the difference in parasitic capacitance and in opening ratio between the scan line G and the pixel electrodes Pe in the individual pixels P in the upper end row.

Incidentally, although the above description has been directed to the case in which the switching elements are connected to the dummy data line S6 and the dummy scan line G7 respectively so as to form the dummy pixels, the present preferred embodiment is not limited to this. No switching element (further, pixel electrode) may be connected to the dummy data line S6 or the dummy scan line G7. In other words, it is also possible to prevent the brightness unevenness as described above by providing only the dummy data line S6 or the dummy scan line S7 without forming any dummy pixels.

Further, in the substrate main body 3a, among the data lines S and the scan lines G, the data lines S arranged along columns with the small number of pixels P are arranged to extend suitably so as to intersect the scan lines G arranged along rows with the small number of pixels P outside the display region. In this manner, the number of the intersections of the scan lines G and the data lines S that are arranged respectively along the rows and columns with the small number of pixels P is increased in the substrate main body 3a, thereby achieving the configuration in which, even when the numbers of pixels P are arranged to be different in a plurality of rows and a plurality of columns according the above-mentioned trapezoidal display region, the brightness unevenness and the line defect can be prevented (details will be described later).

More specifically, in the substrate main body 3a, the data lines S2 and S3 are arranged to extend so as to intersect the scan line G7 outside the display region. Also, the data lines S4 and S5 are arranged to extend so as to intersect the scan lines G5 and G7 outside the display region, and the data line S6 is arranged to extend so as to intersect the scan lines G3, G5 and G7 outside the display region. Further, the data lines S8 and S9 are arranged to extend so as to intersect the scan line G6 outside the display region, and the data lines S10 and S11 are arranged to extend so as to intersect the scan lines G4 and G6 outside the display region.

Moreover, since the scan lines G and the data lines S that are arranged respectively in the rows and columns with the small number of pixels P are arranged to intersect each other as described above, the capacitance is generated at the intersections of these scan lines G and data lines S, achieving a larger load.

Figure 2A:
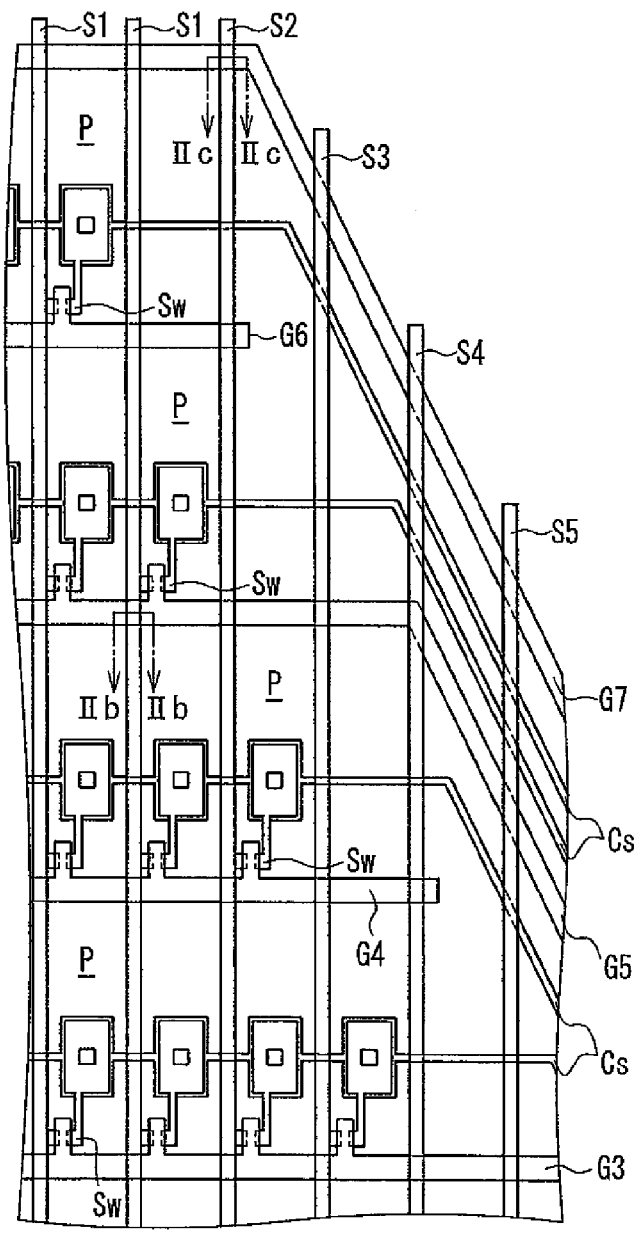
FIG. 2A is a partially enlarged view showing the active matrix substrate shown in FIG. 1.
Figure 2B:
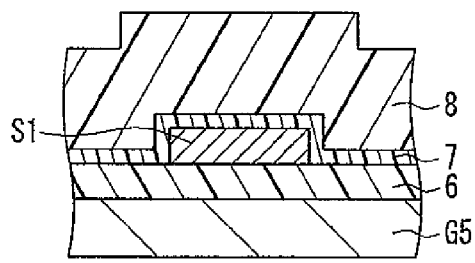
FIG. 2B is a sectional view taken along line IIb-IIb in FIG. 2A.

In other words, as illustrated in FIG. 2A, the data line S2 is arranged to extend straightly upward in the figure so as to intersect the scan line G7. At this intersection of the data line S2 and the scan line G7, the data line S2 and the scan line G7 intersect each other in such a manner as to be opposed to each other via the insulating film 6 similarly to the intersections of the data lines S and the scan lines G inside the display region (see FIGS. 2B and 2C). In this way, at the intersection of the data line S2 and the scan line G7, the capacitance is generated in the insulating film 6 between the data line S2 and the scan line G7.

Figure 2C:
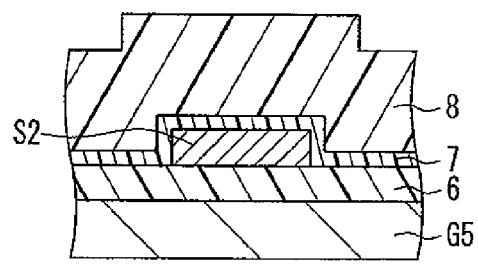
FIG. 2C is a sectional view taken along line IIc-IIc in FIG. 2A.

In other words, at the intersection of the data line S2 and the scan line G7, it becomes possible to generate the same capacitance as that at the intersections inside the display region (for example, the intersection of the data line S1 and the scan line G5 shown in FIG. 2C), so that the load of each of the data line S2 and the scan line G7 can be increased. As a result, in the substrate main body 3a, the non-uniformity of the load can be corrected in the individual data lines S and scan lines G.

Figure 5:
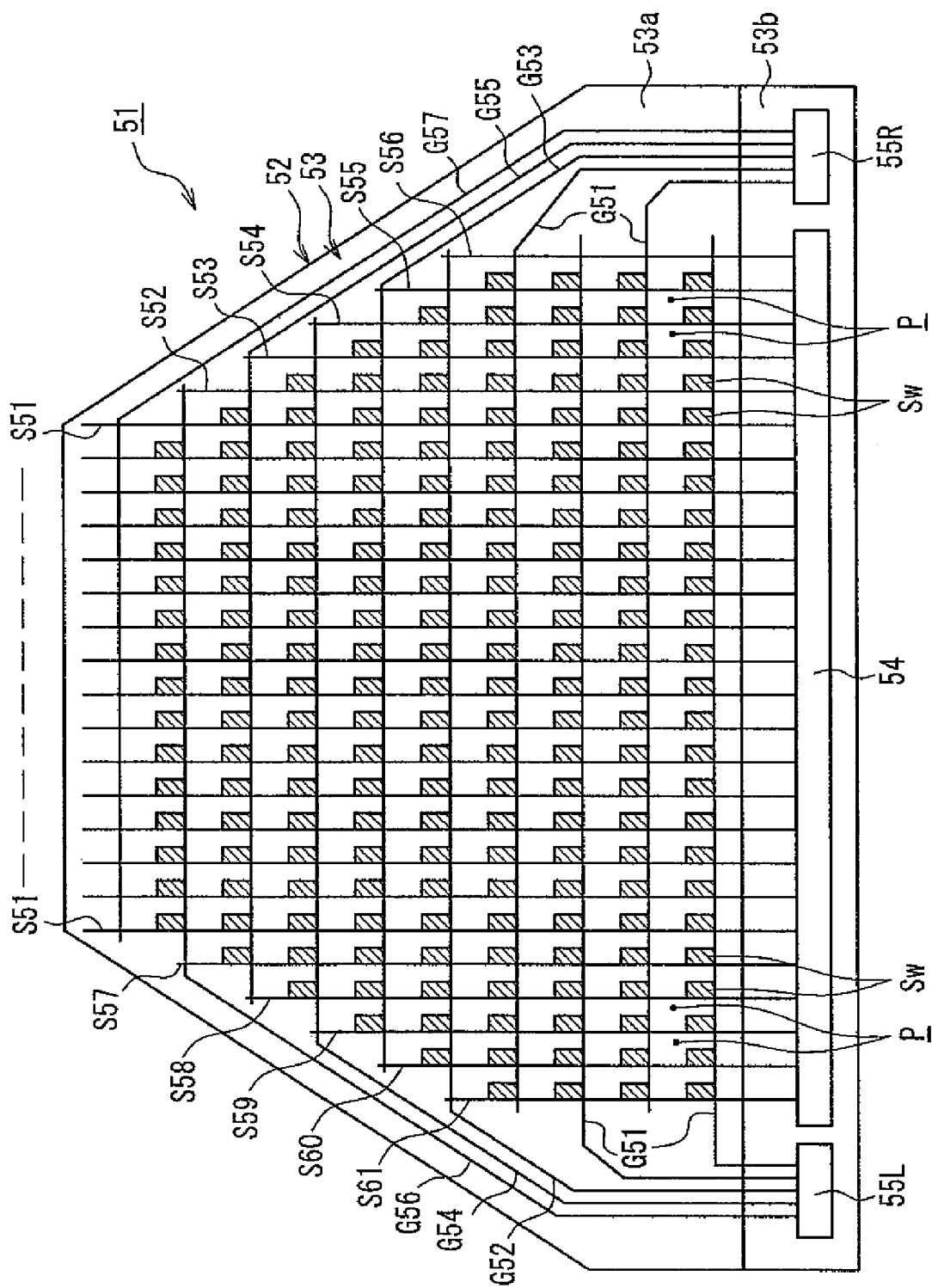
FIG. 5 is a plan view showing a major configuration of an active matrix substrate of a comparative product 1 and a liquid crystal display device including the same.
Figure 6:
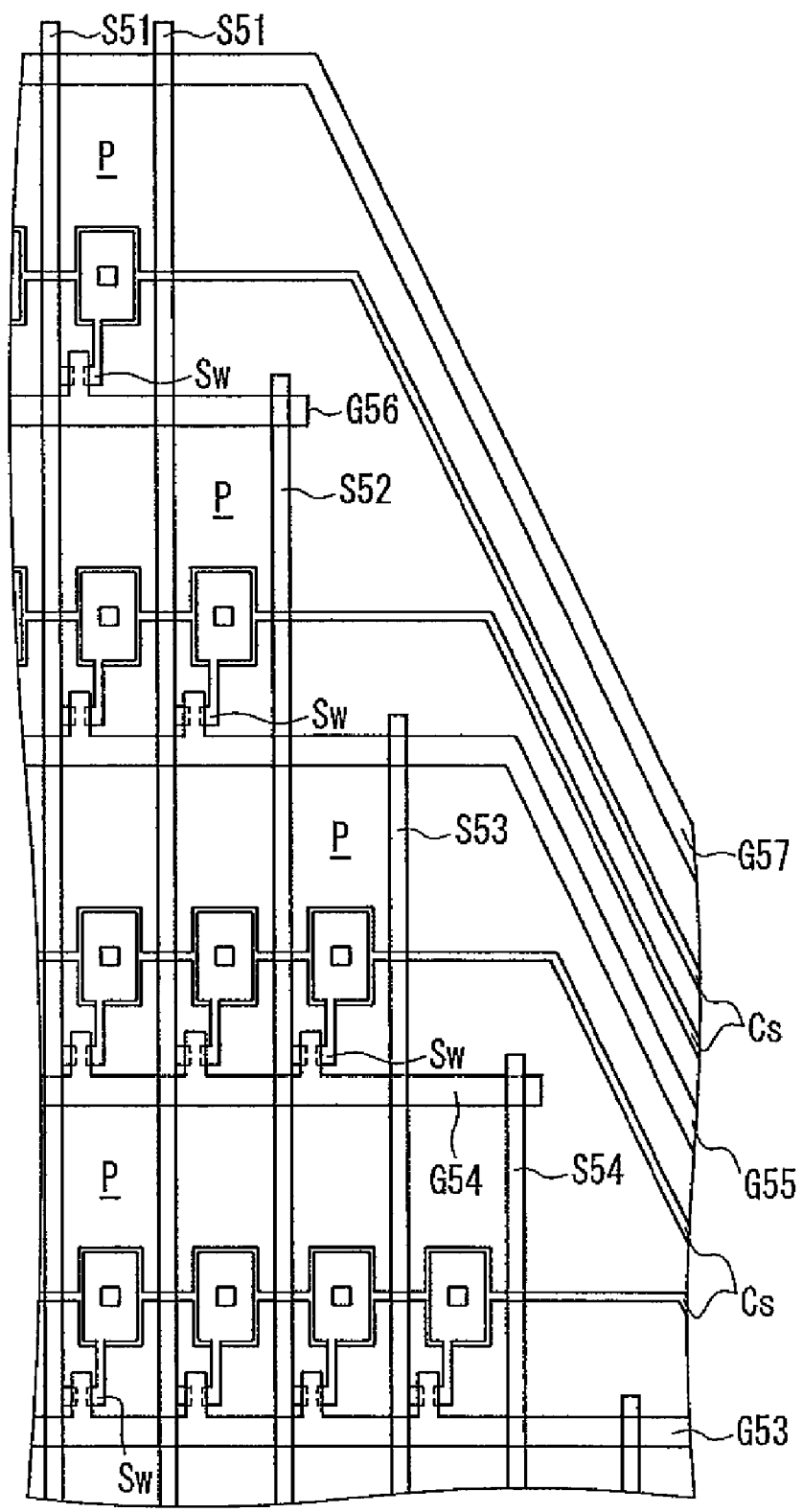
FIG. 6 is a partially enlarged view showing the active matrix substrate shown in FIG. 5.

Now, a product of the present preferred embodiment and a comparative product 1 will be compared also referring to FIGS. 5 to 6, thereby more specifically explaining that the non-uniformity of the load is corrected in the product of the present preferred embodiment.

First, with reference to FIGS. 5 and 6, the comparative product 1 will be described. A liquid crystal display device 51 as this comparative product 1 is a conventional product, and an active matrix substrate 53 including a substrate main body 53a and a driver placement portion 53b is used in a liquid crystal panel 52 of the comparative product 1 as shown in FIG. 5. Further, in the active matrix substrate 53, data lines S51 to S61 and scan lines G51 to G57 are arranged and a plurality of pixels P are provided so as to correspond to a trapezoidal display region that is the same as the product of the present preferred embodiment. Then, in the liquid crystal display device 51, similarly to the product of the present preferred embodiment, data signals from a source driver 54 are inputted to the data lines S51 to S61 and scan signals from gate drivers 55L and 55R are inputted to the corresponding scan lines G51 to G57, whereby information is displayed.

Further, in the substrate main body 53a of the comparative product 1, unlike the product of the present preferred embodiment, the scan lines G52 to G57 and the data lines S52 to S61 that are arranged respectively along rows and columns with the small number of pixels P do not intersect each other outside the display region. More specifically, as illustrated in FIG. 6, in the comparative product 1, the data line S52 does not extend straightly toward the scan line G57 but stops at a position intersecting the scan line G56 so as to form the pixel region of the pixels P inside the display region, unlike the product of the present preferred embodiment shown in FIG. 2.

In the comparative product 1 constituted as above, the number of intersections of the data lines S51 to S61 and that of the scan lines G51 to G57 are as shown in Table 1 below.

TABLE 1

| Data line | The number of intersections | Scan line | The number of intersections |
|---|---|---|---|
| Data line S51 | 10 | Scan line G51 | 26 |
| Data line S52 | 9 | Scan line G52 | 26 |
| Data line S53 | 8 | Scan line G53 | 24 |

TABLE 1-continued

| Data line | The number of intersections | Scan line | The number of intersections |
| --- | --- | --- | --- |
| Data line S54 | 7 | Scan line G54 | 22 |
| Data line S55 | 6 | Scan line G55 | 20 |
| Data line S56 | 5 | Scan line G56 | 18 |
| Data line S57 | 9 | Scan line G57 | 16 |
| Data line S58 | 8 | | |
| Data line S59 | 7 | | |
| Data line S60 | 6 | | |
| Data line S61 | 5 | | |

Here, assuming that the capacitance generated at each of the above-noted intersections is 1 pF, the capacitance difference of 5 pF (=10−5) is generated between the data line S51 and the data line S56, for example. Also, the capacitance difference of 10 pF (=26−16) is generated between the scan line G51 and the scan line G57. In this way, in the data lines S51 to S61 and the scan lines G51 to G57, the capacitance difference is individually generated due to the difference in the number of intersections (namely, the number of pixels), so that the individual loads are also not uniform.

Accordingly, in the comparative product 1, when the data signals and the scan signals having the same voltage values are inputted respectively to the data lines S51 to S61 and the scan lines G51 to G57, the electric potentials of the corresponding data signals or scan signals that are reached within a certain period become different because of the load non-uniformity in the data lines S51 to S61 and the scan lines G51 to G57, respectively. As a result, the brightness unevenness and the line defect occur in the comparative product 1, resulting in a lowered display quality.

On the other hand, in the product of the present preferred embodiment, the scan lines G and the data lines S that are arranged respectively along the rows and columns with the small number of the pixels P are arranged to intersect each other as described above, the number of intersections of the data lines S1 to S11 and that of the scan lines G1 to G7 are as shown in Table 2 below.

TABLE 2

| Data line | The number of intersections | Scan line | The number of intersections |
| --- | --- | --- | --- |
| Data line S1 | 10 | Scan line G1 | 26 |
| Data line S2 | 10 | Scan line G2 | 26 |
| Data line S3 | 9 | Scan line G3 | 25 |
| Data line S4 | 9 | Scan line G4 | 24 |
| Data line S5 | 8 | Scan line G5 | 23 |
| Data line S6 | 8 | Scan line G6 | 22 |
| Data line S7 | 9 | Scan line G7 | 21 |
| Data line S8 | 9 | | |
| Data line S9 | 8 | | |
| Data line S10 | 8 | | |
| Data line S11 | 7 | | |

Here, assuming that the capacitance generated at each of the above-noted intersections in the product of the present preferred embodiment is 1 pF similarly to the comparative product 1, the capacitance difference between the data line S1 and the data line S6 is 2 pF (=10−8), for example, which is smaller than the capacitance difference of 5 pF in the comparative product 1. Likewise, the capacitance difference between the scan line G1 and the scan line G7 is 5 pF (=26−21), which is smaller than the capacitance difference of 10 pF in the comparative product 1.

As described above, the respective capacitance differences in the data lines S1 to S11 and the scan lines G1 to G7 in the product of the present preferred embodiment can be smaller than those in the comparative product 1, thereby correcting the load non-uniformity. Consequently, in the product of the present preferred embodiment, it is possible to prevent the generation of the brightness unevenness and the line defect and thus prevent the display quality from lowering.

Also, in the product of the present preferred embodiment, only the data lines S among the data lines S and the scan lines G are arranged to extend suitably so as to intersect the scan lines G outside the display region, thereby correcting the load non-uniformity and improving the display quality as described above. In other words, in the product of the present preferred embodiment, the scan lines G are arranged so that the input directions of the scan signal alternate, and the scan lines G suitably intersect the data lines S while their non-input sides to which the scan signals are not inputted are not arranged to extend. This allows simplification of the routing work of the scan lines G, thus making it possible to produce the active matrix substrate 3 efficiently.

Figure 7:
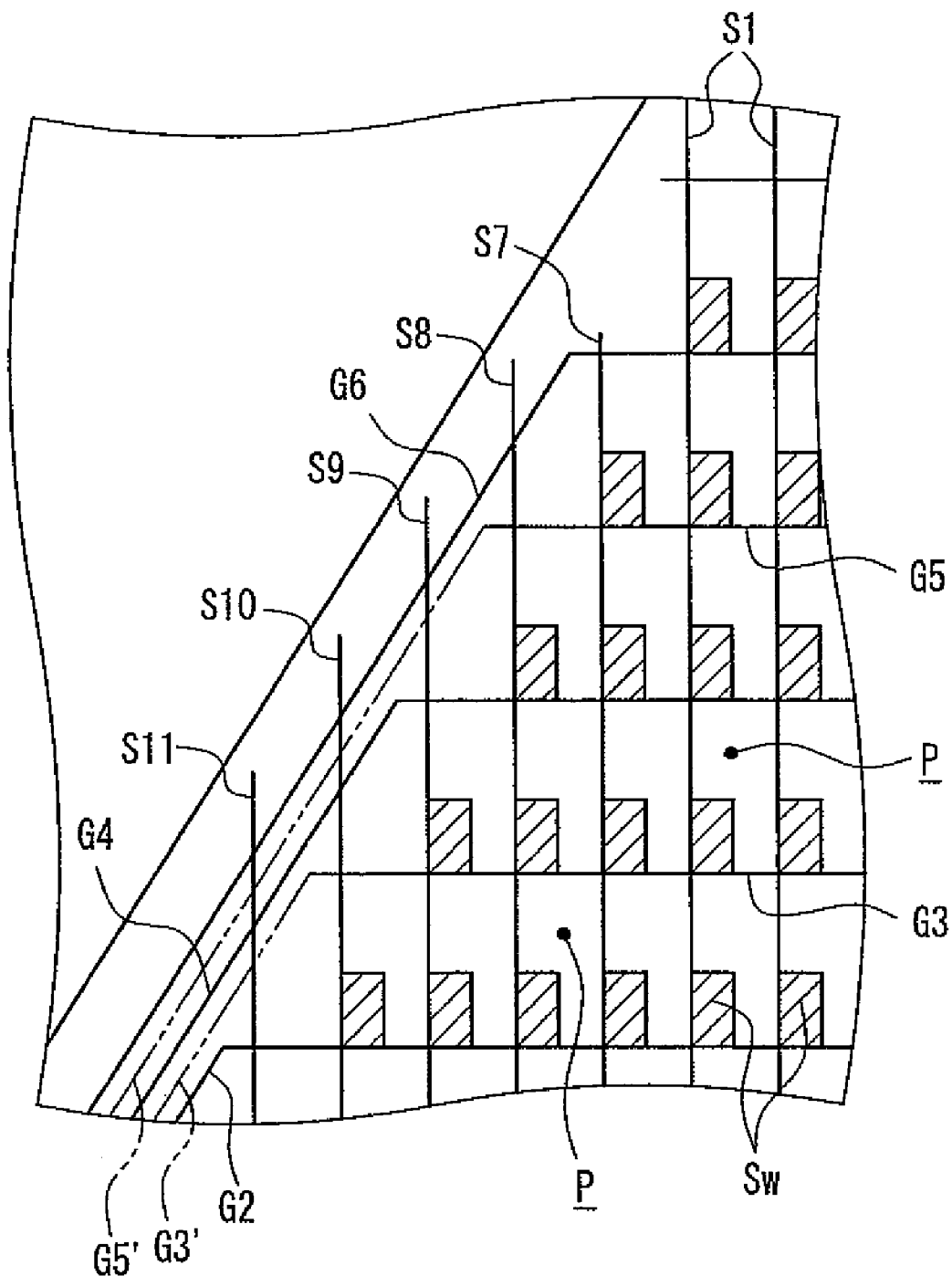
FIG. 7 is a partially enlarged view showing an active matrix substrate of a comparative product 2.

More specifically, as indicated by a chain double-dashed line in FIG. 7, for example, the non-input side of the scan line G3 is arranged to extend so as to intersect the data line S11 or the non-input side of the scan line G5 is arranged to extend so as to intersect the data lines S9 to S11, whereby the load non-uniformity of the scan lines G3 and G5 with respect to the scan line G1, etc. can be corrected further.

However, when the respective non-input sides of the scan lines G3 and G5 are arranged to extend as shown in FIG. 7, their wiring portions on the non-input sides have to be located between the scan lines G2 and G4 and the scan lines G4 and G6. Therefore, the leakage of the scan signal becomes likely to occur between the wiring portions on the non-input sides and the corresponding scan lines G2, G4 and G6.

On the other hand, since the respective non-input sides of the scan lines G3 and G5 are not arranged to extend in the product of the present preferred embodiment, the routing work of the scan lines G2 to G6 can be carried out in a simple manner, and further, the leakage of the scan signal between the two adjacent scan lines G can be prevented easily. As a result, it is possible to constitute the active matrix substrate 3 that has a small fraction defective and is produced in a simple manner.

In a plurality of the pixels P, by making the number of the pixels P provided along at least one row among a plurality of rows and the number of the pixels P provided along the other rows different from each other and making the number of pixels P provided along at least one column among a plurality of columns and the number of the pixels P provided along the other columns different from each other, the active matrix substrate 3 of the present preferred embodiment constituted as above can correspond to the display region of the trapezoidal liquid crystal panel (display panel) 2.

Also, in the active matrix substrate 3 of the present preferred embodiment, the scan lines G3 to G7 that are arranged along the rows with the smaller number of pixels P than the other rows among a plurality of the scan lines (first signal lines) G and the data lines S2 to S6 and S8 to S11 that are arranged along the columns with the smaller number of pixels P than the other columns among a plurality of the data lines (second signal lines) S are arranged to intersect each other outside the display region. In this way, in the active matrix substrate 3 of the present preferred embodiment, it is possible to generate the capacitance at the intersections outside the display region respectively for the scan lines G3 to G7 and the data lines S2 to S6 and S8 to S11 with the small number of the pixels P.

Consequently, in the active matrix substrate 3 of the present preferred embodiment, it is possible to correct the load non-uniformity in the individual signal lines of the data lines S and the scan lines G without changing the signal voltage values to the data lines S and the scan lines G. Therefore, even when the active matrix substrate 3 of the present preferred embodiment is used for the trapezoidal display region, it can prevent the generation of the brightness unevenness and the line defect, etc. due to the load non-uniformity and thus easily prevent the display quality from lowering, unlike the conventional example described above.

Also, even when the liquid crystal panel 2 of the present preferred embodiment is used for the trapezoidal display region, the active matrix substrate 3 that easily prevents the display quality from lowering is used, so that the liquid crystal panel having an excellent display performance can be achieved easily.

Further, since the liquid crystal display device 1 of the present preferred embodiment has the trapezoidal display region and the liquid crystal panel 2 having an excellent display performance is used in the display portion, it is possible to easily achieve a high-performance liquid crystal display device including a display region having a shape other than a rectangular shape.

Preferred Embodiment 2

Figure 8:
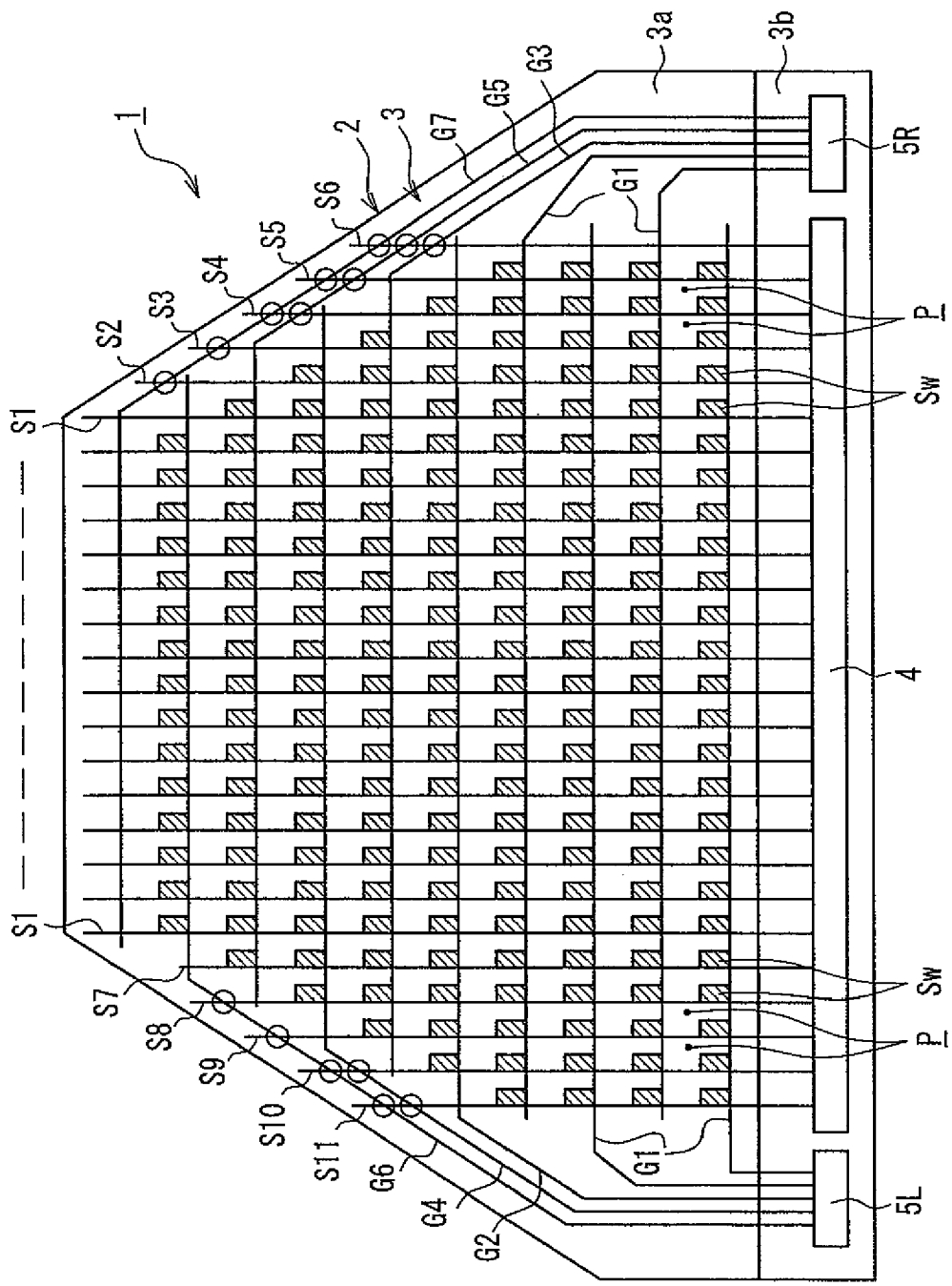
FIG. 8 is a plan view showing a major configuration of an active matrix substrate according to Preferred Embodiment 2 of the present invention and a liquid crystal display device using the same.
Figure 9A:
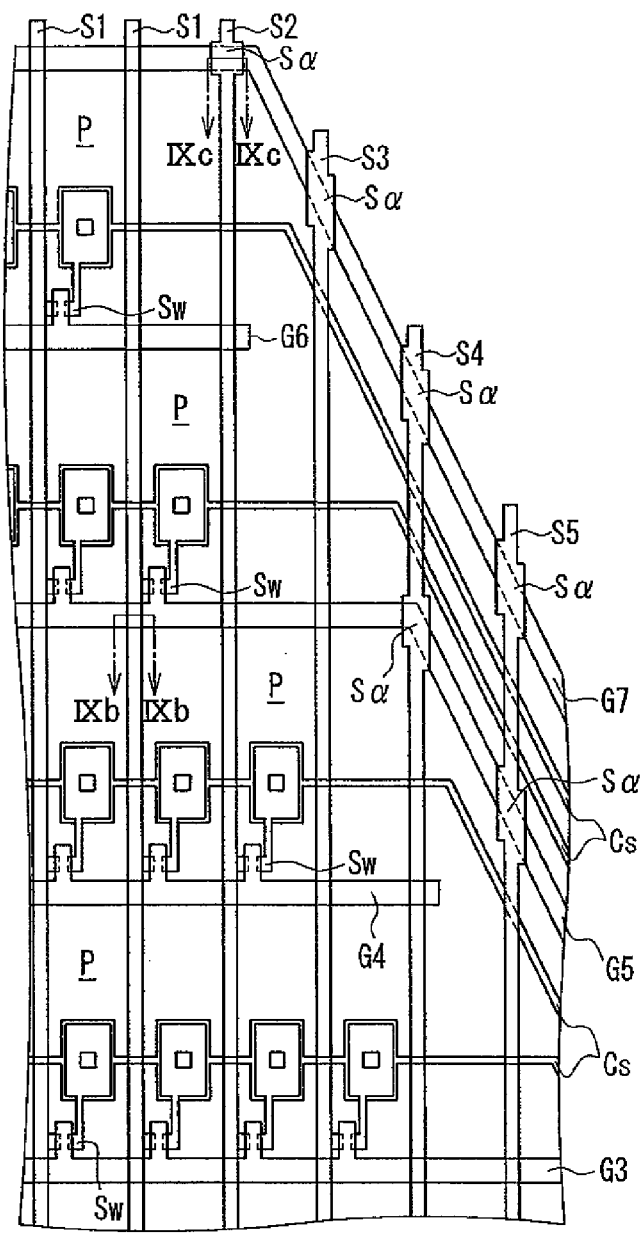
FIG. 9A is a partially enlarged view showing the active matrix substrate shown in FIG. 8.
Figure 9B:
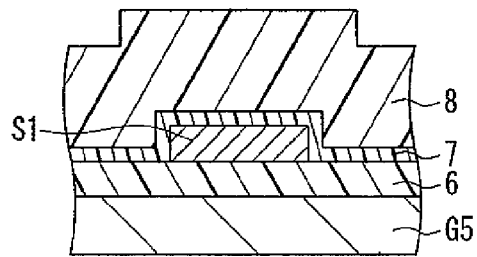
FIG. 9B is a sectional view taken along line IXb-IXb in FIG. 9A.
Figure 9C:
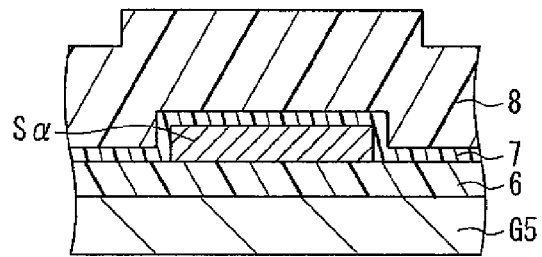
FIG. 9C is a sectional view taken along line IXc-IXc in FIG. 9A.

FIG. 8 is a plan view showing a major configuration of an active matrix substrate according to Embodiment 2 of the present invention and a liquid crystal display device using the same. FIG. 9A is a partially enlarged view showing the active matrix substrate shown in FIG. 8, FIG. 9B is a sectional view taken along line IXb-IXb in FIG. 9A, and FIG. 9C is a sectional view taken along line IXc-IXc in FIG. 9A. In the figures, the present preferred embodiment is different from Preferred Embodiment 1 described above mainly in that opposed areas where a plurality of data lines and a plurality of scan lines are opposed to each other at their intersection outside the display region are larger than opposed areas where they are opposed to each other at their intersection in the display region. Incidentally, elements that are in common with Preferred Embodiment 1 described above are assigned the same reference signs, and the redundant description thereof will be omitted.

In other words, in FIG. 8, the active matrix substrate 3 of the present preferred embodiment is constituted so that the opposed areas of the data lines S and the scan lines G that are opposed to each other at the intersection outside the display region, which are indicated by hollow circles in this figure, are larger than the opposed areas thereof at the intersection inside the display region.

More specifically, as illustrated in FIG. 9A, each of the data lines S2 and S3 is provided with an enlarged portion Sα formed to be larger than the other portion at the intersection with the scan line G7. Also, each of the data lines S4 and S5 is provided with the enlarged portion Sα formed to be larger than the other portion at the respective intersections with the scan lines G5 and G7.

Further, the enlarged portion Sα is preferably larger than the other portion so that the opposed areas of the data lines S opposed to the scan lines G at the intersection are larger, for example, twice as large. In other words, compared with the data line S1 inside the display region illustrated in FIG. 9B, the dimension of the enlarged portion Sα along the horizontal direction in the figure is doubled so as to achieve a twice as large opposed area of the data line S1 opposed to the scan line G5, as shown in FIG. 9C. In this way, it is possible to double the capacitance generated in the insulating film 6 between the data line S1 and the scan line G7.

With the above configuration, the active matrix substrate 3 of the present preferred embodiment can reliably increase the capacitance generated at the intersections outside the display region compared with Preferred Embodiment 1, thus making it possible to correct the load non-uniformity easily in the individual signal lines of the data lines S and the scan lines G.

More specifically, assuming that the capacitance generated at each of the above-noted intersections is 1 pF similarly to Preferred Embodiment 1, the sum of the capacitances generated at the intersections of the individual signal lines of the data lines S1 to S11 and that of the individual signal lines of the scan lines G1 to G7 are as shown in Table 3 below.

TABLE 3

| Data line | The sum of capacitances at intersections | Scan line | The sum of capacitances at intersections |
|---|---|---|---|
| Data line S1 | 10 pF | Scan line G1 | 26 pF |
| Data line S2 | 11 pF | Scan line G2 | 26 pF |
| Data line S3 | 10 pF | Scan line G3 | 26 pF |
| Data line S4 | 11 pF | Scan line G4 | 26 pF |
| Data line S5 | 10 pF | Scan line G5 | 26 pF |
| Data line S6 | 11 pF | Scan line G6 | 26 pF |
| Data line S7 | 9 pF | Scan line G7 | 26 pF |
| Data line S8 | 10 pF | | |
| Data line S9 | 9 pF | | |
| Data line S10 | 10 pF | | |
| Data line S11 | 9 pF | | |

As becomes clear from Table 3, in the active matrix substrate 3 of the present preferred embodiment, the capacitance distribution in the data lines S, namely, the maximum capacitance difference among the data lines S1 to S11 is 2 pF (=11−9), which is smaller than the capacitance difference of 3 pF (=10−7) in Preferred Embodiment 1 shown in Table 2. Further, since the capacitance sum is set to 26 pF in all of the scan lines G1 to G7, the capacitance distribution in the scan lines G is 0 pF, and the capacitance difference of 5 pF (=26−21) in Preferred Embodiment 1 is removed.

As described above, in the active matrix substrate 3 of the present preferred embodiment, the load non-uniformity in the individual signal lines of the data lines S and the scan lines G is corrected further compared with Preferred Embodiment 1, so that it is possible to reliably prevent the generation of the brightness unevenness and the line defect and thus reliably prevent the display quality from lowering.

Although the above description has been directed to the case in which the data lines S are provided with the enlarged portion Sα so as to achieve twice as large areas opposed to the scan lines G, it is also possible to provide at least one of the data lines S and the scan lines G with enlarged portions so as to enlarge the opposed areas of the data lines S and the scan lines G that are opposed to each other at the intersection outside the display region.

Also, the opposed areas may be more than twice as large by the above-described enlarged portion. With such a configuration, it is possible to reduce the capacitance difference in the switching element Sw, etc. included in each of the pixels P, so that the load non-uniformity in the individual signal lines of the data lines S and the scan lines G can be corrected more easily.

Further, besides the above description, in the individual signal lines of the data lines S and the scan lines G, the insulating film 6 provided at the intersection outside the display region may be made thinner than the insulating film 6 provided at the intersection in the display region. In other words, when the insulating film 6 shown in FIG. 9B has a thickness of, for example, $4000 \times 10^{-10}$ (m), the insulating film 6 shown in FIG. 9C may be set to have a thickness of $2000 \times 10^{-10}$ (m).

As described above, the thickness of the insulating film 6 provided at the intersection outside the display region is set to be a half of that of the insulating film 6 provided at the intersection in the display region, whereby it is possible to double the capacitance generated in the insulating film 6 between the data lines S and the scan lines G.

Also, when the thickness of the insulating film 6 provided at the intersection outside the display region is set to be equal to or smaller than a half of that of the insulating film 6 provided at the intersection in the display region, it is possible to reduce the capacitance difference in the switching element Sw, etc. included in each of the pixels P similarly to the case in which the opposed areas are preferably at least twice as large by the enlarged portion as described above, so that the load non-uniformity in the individual signal lines of the data lines S and the scan lines G can be corrected more easily.

Furthermore, by changing both of the opposed areas of the data lines S and the scan lines G and the thickness of the insulating film 6 at the intersection outside the display region, it is also possible to correct the load non-uniformity in the individual signal lines of the data lines S and the scan lines G. Also, when the insulating film between the data lines S and the scan lines G is formed to have a multilayered structure including an insulating film other than the insulating film 6, for example, the number of insulating film layers at the intersection outside the display region is smaller than that of insulating film layers at the intersection inside the display region, whereby it is also possible to correct the load non-uniformity in the individual signal lines of the data lines S and the scan lines G.

Preferred Embodiment 3

Figure 10:
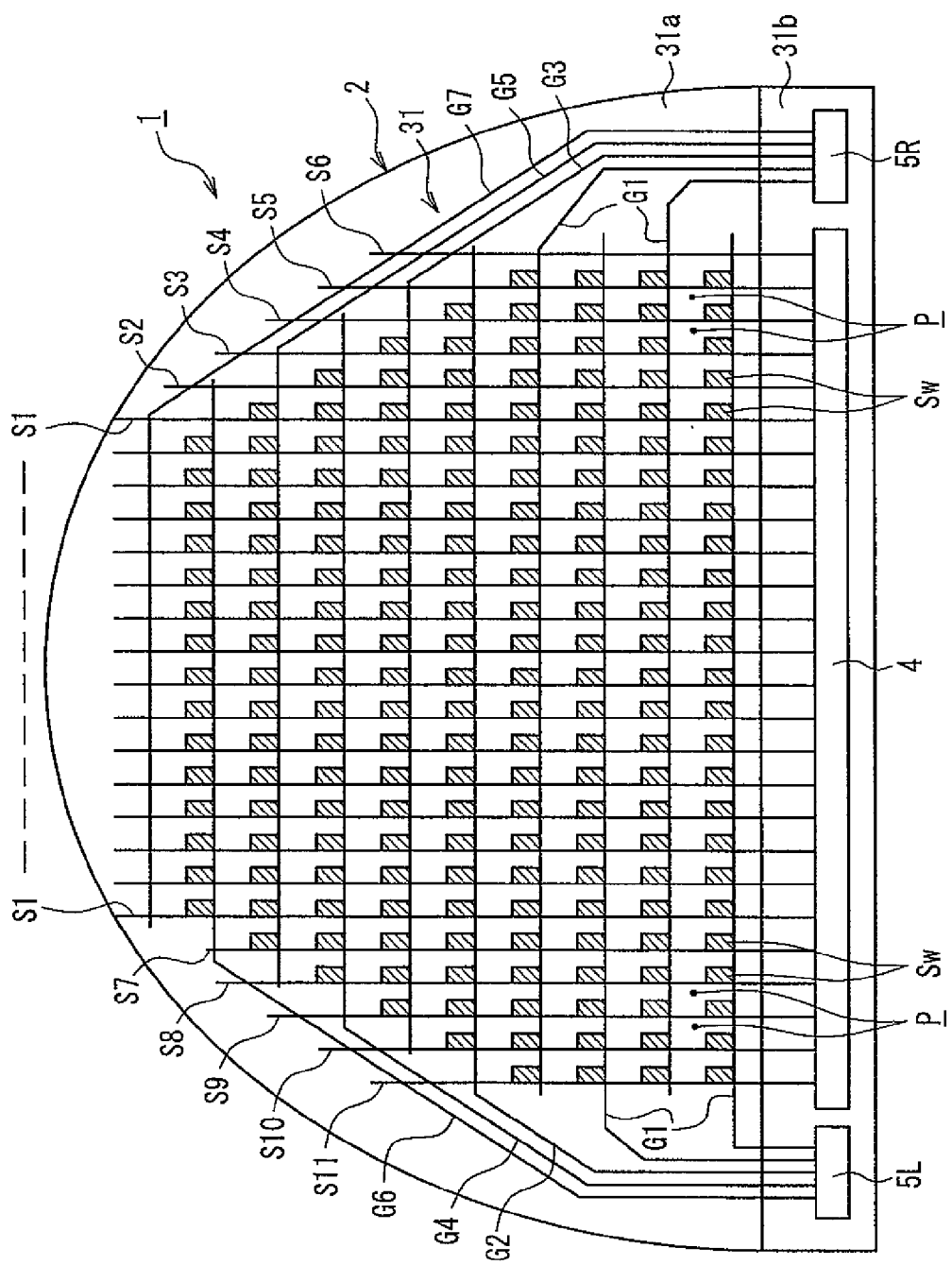
FIG. 10 is a plan view showing a major configuration of an active matrix substrate according to Preferred Embodiment 3 of the present invention and a liquid crystal display device including the same.

FIG. 10 is a plan view showing a major configuration of an active matrix substrate according to Preferred Embodiment 3 of the present invention and a liquid crystal display device using the same. In the figure, the present preferred embodiment is different from Preferred Embodiment 1 described above mainly in that a liquid crystal panel having a semicircular outer shape instead of the trapezoidal shape is provided. Incidentally, elements that are in common with Preferred Embodiment 1 described above are assigned the same reference signs, and the redundant description thereof will be omitted.

In other words, as shown in FIG. 10, a liquid crystal display device 1 according to the present preferred embodiment includes a liquid crystal panel 2 formed to have a semicircular outer shape and an active matrix substrate 31, and a plurality of pixels P are provided so as to correspond to a semicircular display region.

Also, the active matrix substrate 31 includes a substrate main body 31a in which a plurality of data lines S1 to S11 and a plurality of scan lines G1 to G7 are arranged, and a driver placement portion 31b in which a source driver 4 that is connected to the data lines S and inputs data signals and gate drivers 5L and 5R that are connected to the scan lines G and input scan signals are provided.

Further, in the active matrix substrate 31, the scan lines G3 to G7 that are arranged along the rows with the smaller number of pixels P than the other rows and the data lines S2 to S6 and S8 to S11 that are arranged along the columns with the smaller number of pixels P than the other columns are arranged to intersect each other outside the display region.

With the above configuration, the present preferred embodiment can produce an effect similar to that in Preferred Embodiment 1. In other words, even when the active matrix substrate 31 of the present preferred embodiment is used for the semicircular display region, it can prevent the generation of the brightness unevenness and the line defect due to the load non-uniformity and thus easily prevent the display quality from lowering. Therefore, it is possible to easily achieve the liquid crystal panel 2 and the liquid crystal display device 1 having the semicircular display region and an excellent display performance.

Incidentally, besides the above description, by changing either one of the opposed areas of the data lines S and the scan lines G and the thickness of the insulating film 6 at the intersection outside the display region, it is also possible to correct the load non-uniformity in the individual signal lines of the data lines S and the scan lines G, similarly to Preferred Embodiment 2 (The same will apply also in each of the preferred embodiments described later.).

Preferred Embodiment 4

Figure 11:
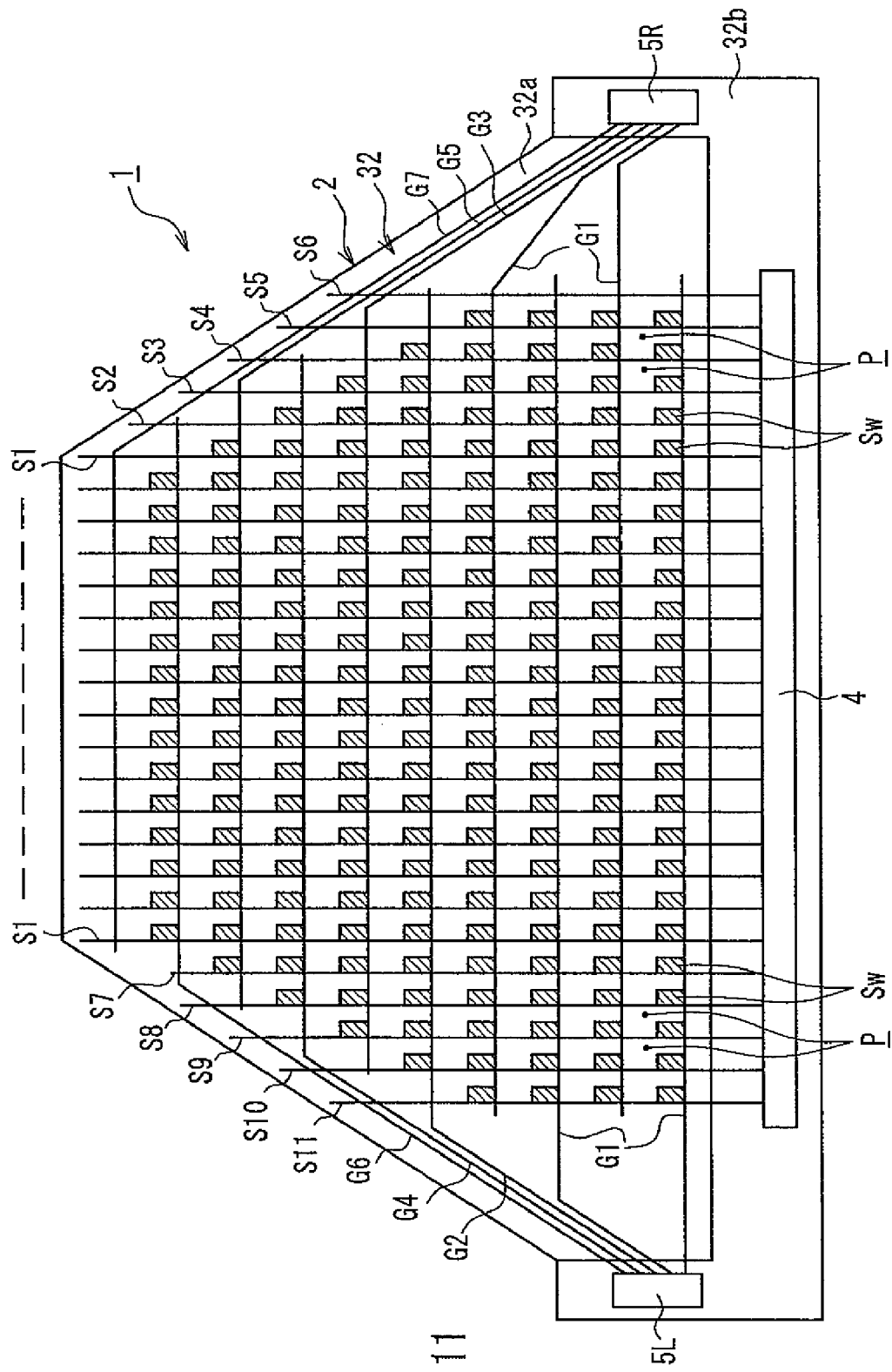
FIG. 11 is a plan view showing a major configuration of an active matrix substrate according to Preferred Embodiment 4 of the present invention and a liquid crystal display device including the same.

FIG. 11 is a plan view showing a major configuration of an active matrix substrate according to Preferred Embodiment 4 of the present invention and a liquid crystal display device using the same. In the figure, the present preferred embodiment is different from Preferred Embodiment 1 described above mainly in that the shape of the driver placement portion is changed to an angular U shape and the above-described two gate drivers are placed so as to be opposed to each other. Incidentally, elements that are in common with Preferred Embodiment 1 described above are assigned the same reference signs, and the redundant description thereof will be omitted.

In other words, as shown in FIG. 11, an active matrix substrate 32 of the present preferred embodiment includes a substrate main body 32a in which a plurality of data lines S1 to S11 and a plurality of scan lines G1 to G7 are arranged, and a driver placement portion 32b in which a source driver 4 that is connected to the data lines S and inputs data signals and gate drivers 5L and 5R that are connected to the scan lines G and input scan signals are provided. The driver placement portion 32b is formed to have the angular U shape so as to be adapted to the outer shape of a liquid crystal panel 2, and the gate drivers 5L and 5R are provided so as to be opposed to each other. This makes it possible to easily route the plurality of scan lines G1 to G7 on the substrate main body 32a and to minimize an unnecessary increase in the outer dimension of the liquid crystal panel 2.

Further, in the active matrix substrate 32, the scan lines G3 to G7 that are arranged along the rows with the smaller number of pixels P than the other rows and the data lines S2 to S6 and S8 to S11 that are arranged along the columns with the smaller number of pixels P than the other columns are arranged to intersect each other outside the display region.

With the above configuration, the present preferred embodiment can produce an effect similar to that in Preferred Embodiment 1.

Preferred Embodiment 5

Figure 12:
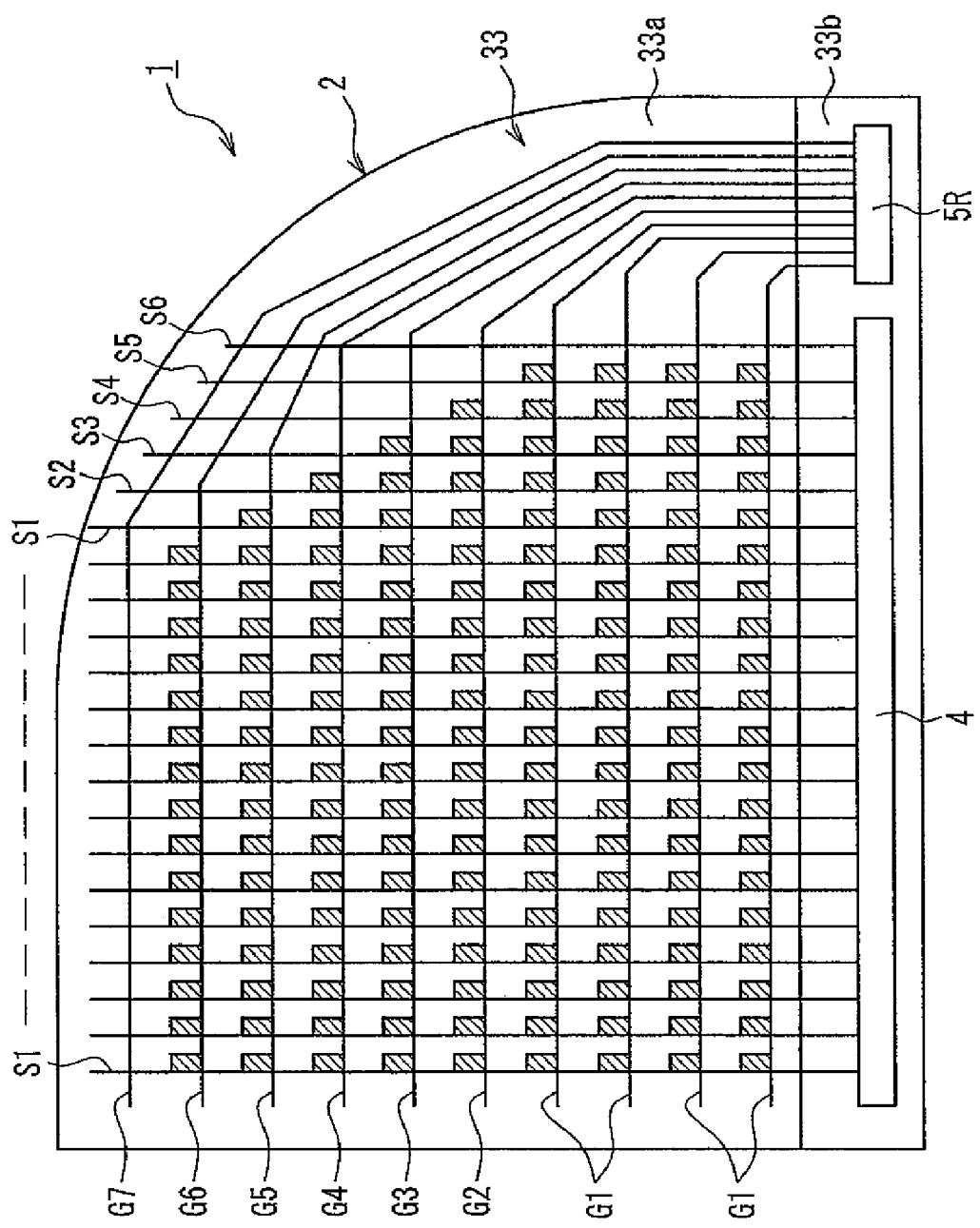
FIG. 12 is a plan view showing a major configuration of an active matrix substrate according to Preferred Embodiment 5 of the present invention and a liquid crystal display device including the same.

FIG. 12 is a plan view showing a major configuration of an active matrix substrate according to Preferred Embodiment 5 of the present invention and a liquid crystal display device using the same. In the figure, the present preferred embodiment is different from Preferred Embodiment 1 described above mainly in that a liquid crystal panel having a quadrantal outer shape instead of the trapezoidal shape is provided. Incidentally, elements that are in common with Preferred Embodiment 1 described above are assigned the same reference signs, and the redundant description thereof will be omitted.

In other words, as shown in FIG. 12, a liquid crystal display device 1 according to the present preferred embodiment includes a liquid crystal panel 2 formed to have a quadrantal outer shape and an active matrix substrate 33, and a plurality of pixels P are provided so as to correspond to a quadrantal display region.

Also, the active matrix substrate 33 includes a substrate main body 33a in which a plurality of data lines S1 to S6 and a plurality of scan lines G1 to G7 are arranged. Further, in the active matrix substrate 33 of the present preferred embodiment, only a gate driver 5R that inputs scan signals to the scan lines G is placed in a driver placement portion 33b, for example, in order to minimize the outer shape of the liquid crystal panel 2 (the liquid crystal display device 1). In other words, as shown in the figure, in the driver placement portion 33b, a source driver 4 that is connected to the data lines S and inputs data signals and the gate driver 5R that is connected to the scan lines G and inputs scan signals are provided. Then, the gate driver 5R inputs the scan signals to the scan lines G from the right side of the figure.

Further, in the active matrix substrate 33, the scan lines G2 to G7 that are arranged along the rows with the smaller number of pixels P than the other rows and the data lines S2 to S6 that are arranged along the columns with the smaller number of pixels P than the other columns are arranged to intersect each other outside the display region.

With the above configuration, the present preferred embodiment can produce an effect similar to that in Preferred Embodiment 1. In other words, even when the active matrix substrate 33 of the present preferred embodiment is used for the quadrantal display region, it can prevent the generation of the brightness unevenness and the line defect due to the load non-uniformity and thus easily prevent the display quality from lowering. Therefore, it is possible to easily achieve the liquid crystal panel 2 and the liquid crystal display device 1 having the quadrantal display region and an excellent display performance.

It should be noted that the preferred embodiments described above are all illustrative and not restrictive. The technological scope of the present invention is indicated by the claims, and all changes that come within the meaning and range of equivalency of the claims are intended to be embraced therein.

For example, although the above description has been directed to the case in which the present invention is applied to a transmission type liquid crystal display device, the display device according to various preferred embodiments of the present invention is by no means limited as long as the display panel including the active matrix substrate is used in the display portion. More specifically, the display panel and the display device according to various preferred embodiments of the present invention are applicable to various display panels using an active matrix substrate such as semi-transparent or reflective liquid crystal panels or organic EL (Electronic Luminescence) elements, inorganic EL elements, Field Emission Displays or the like and display devices using them in the display portion.

Further, although the above description has been directed to the case in which only the data line S among the scan line (first signal line) G and the data line (second signal line) S is arranged to extend, the active matrix substrate according to the present invention is appropriate as long as at least one signal lines of the first signal line that is arranged along the row with the smaller number of pixels than the other rows among the plurality of first signal lines and the second signal line that is arranged along the column with the smaller number of pixels than the other columns among the plurality of second signal lines are arranged to extend so as to intersect the other signal lines at positions other than the display region.

However, it is more preferable that only one signal line of the first and second signal lines is arranged to extend so as to intersect the other signal line at position other than the display region as in the preferred embodiments described above because the size reduction of the active matrix substrate can be achieved in a simple manner.

Also, although the above description has been directed to the configuration in which the dummy data line S6 is arranged to extend and intersect or the data line S1 is arranged to intersect the dummy scan line G7, the active matrix substrate according to preferred embodiments of the present invention is not limited to this. Only the first and second signal lines for pixels provided in an effective display region that is visually identified by a user may be arranged to intersect each other at the positions other than the display region.

Moreover, although the above description has been directed to the case in which the first and second signal lines with the small number of pixels are arranged to intersect each other outside the display region, the active matrix substrate according to preferred embodiments of the present invention is appropriate as long as the first and second signal lines with the small number of pixels are arranged to intersect each other at position other than the display region.

More specifically, when the active matrix substrate according to preferred embodiments of the present invention is applied to a ring-shaped display panel in which a circular non-display region is formed at the center of the display region, for example, it is appropriate to make the first and second signal lines with the small number of pixels intersect each other at positions corresponding to the circular non-display region inside the display region. In this way, also for an odd-shaped display panel provided with the non-display region inside the display region such as a ring-shaped display panel or a picture-frame-shaped display panel, the active matrix substrate according to preferred embodiments of the present invention can easily achieve a high quality display panel by correcting the load non-uniformity of the first and second signal lines without changing any signal voltage or omitting any light-shielding member.

Further, although the above description has been directed to the case of using the scan lines as the first signal line arranged along the row direction of the matrix and the data lines as the second signal line arranged along the column direction of the matrix, the data lines and the scan lines may be arranged along the row direction and the column direction and used as the first and second signal lines, respectively.

Moreover, although the above description has been directed to the case of using the thin film transistor as the switching element, the switching element of the present invention is not limited to this. It is also possible to use other three-terminal switching elements such as a field effect transistor or two-terminal switching elements such as a thin film diode.

Additionally, although the above description has been directed to the case of providing the substrate main body in which the first and second signal lines are arranged and the circuit placement portion in which the first and second driving circuits for inputting signals to the first and second signal lines, respectively, are provided, the active matrix substrate according to preferred embodiments of the present invention is not limited to this and is appropriate as long as at least the substrate main body described above is provided.

However, it is more preferable to provide the circuit placement portion constituted as one piece with the substrate main body as in the preferred embodiments described above because the work of connecting a plurality of the first signal lines and a plurality of the second signal lines with the first and second driving circuits can be carried out in a simple manner and a compact active matrix substrate with an excellent handleability can be achieved.

Furthermore, the above description has been directed to the case in which the active matrix substrate according to preferred embodiments of the present invention is applied to the liquid crystal panels having the trapezoidal, semicircular and quadrantal display regions, the active matrix substrate of the present invention is not limited to them. More specifically, the active matrix substrate according to preferred embodiments of the present invention is applicable to a display panel having an odd-shaped display region with a shape other than the rectangular (including square) shape, for example, a polygonal shape such as a shape of triangle, parallelogram, rhombus or polygon with at least five vertexes, a circular-arc shape such as a shape of circle or semicircle, or a combination of the polygonal shape and the circular-arc shape.

The present invention is useful for an active matrix substrate that can easily prevent the display quality from lowering even when it is used for a display region with a shape other than a rectangular shape, and a high-performance display panel and a display device using the same.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An active matrix substrate comprising:
   a plurality of pixels arranged in a matrix including a plurality of rows and a plurality of columns arranged to define a display panel;
   a plurality of first signal lines arranged along a row direction in the matrix; and
   a plurality of second signal lines arranged along a column direction in the matrix so as to intersect the first signal lines; wherein
   in the plurality of pixels, a total number of the pixels provided along at least one row and a total number of the pixels provided along the other rows of the plurality of rows are different from each other and a total number of the pixels provided along at least one column and a total number of the pixels provided along the other columns of the plurality of columns are different from each other, so as to correspond to a display region of the display panel that has a shape other than a rectangular shape;
   at least one of the plurality of first signal lines that is arranged along a row with a smaller number of the pixels than other rows among the plurality of first signal lines and/or at least one of the plurality of second signal lines that is arranged along a column with a smaller number of the pixels than other columns among the plurality of second signal lines is arranged to extend in a direction away from a driver connected to an input end of the at least one of the plurality of first signal lines and/or the at least one of the plurality of second signal lines; and
   the at least one of the plurality of first signal lines that is arranged along the row with the smaller number of the pixels than the other rows among the plurality of first signal lines and at least one of the plurality of second signals line that is arranged along the column with the smaller number of the pixels than the other columns among the plurality of second signal lines are arranged to intersect with each other, in a region other than the display region, at an end thereof that is opposite to the input end connected to the driver.

2. The active matrix substrate according to claim 1, wherein, in the plurality of first signal lines and the plurality of second signal lines, one signal line of the first signal line that is arranged along the row with the smaller number of the pixels than the other rows and the second signal line that is arranged along the column with the smaller number of the pixels than the other columns is arranged to extend so as to intersect the other signal lines at the position other than the display region.

3. The active matrix substrate according to claim 1, wherein at least one signal line of the plurality of first signal lines and the plurality of second signal lines comprise signal lines whose signal input directions of signals to be inputted are different from each other.

4. The active matrix substrate according to claim 3, wherein, when the at least one signal line of the plurality of first signal lines and the plurality of second signal lines comprise the signal lines whose signal input directions are different from each other, input sides of the signals in the one signal lines intersect the other signal lines of the plurality of first signal lines and the plurality of second signal lines at the position other than the display region.

5. The active matrix substrate according to claim 1, wherein opposed areas where the plurality of first signal lines and the plurality of second signal lines are opposed to each other at an intersection at the position other than the display region are larger than opposed areas where they are opposed to each other at their intersection in the display region.

6. The active matrix substrate according to claim 5, wherein the opposed areas at the intersection at the position other than the display region are at least twice as large as the opposed areas at the intersection in the display region.

7. The active matrix substrate according to claim 1, wherein an insulating film provided at the intersection of the plurality of first signal lines and the plurality of second signal lines at the position other than the display region is thinner than that provided at the intersection in the display region.

8. The active matrix substrate according to claim 7, wherein the thickness of the insulating film provided at the intersection at the position other than the display region is equal to or smaller than a half of that of the insulating film provided at the intersection in the display region.

9. The active matrix substrate according to claim 1, comprising:
   a substrate main body in which the plurality of first signal lines and the plurality of second signal lines are arranged; and
   a circuit placement portion including a first driving circuit and a second driving circuit for inputting signals to the plurality of first signal lines and the plurality of second signal lines, respectively.

10. A display panel comprising the active matrix substrate according to claim 1.

11. The display panel according to claim 10, having an outer shape that is determined based on the display region that has a shape other than the rectangular shape.

12. The display panel according to claim 10, comprising:
    an opposed substrate that is disposed so as to be opposed to the active matrix substrate; and
    a liquid crystal layer that is provided between the active matrix substrate and the opposed substrate.

13. A display device comprising a display portion wherein the display panel according to claim 10 is provided in the display portion.

* * * * *